(12) United States Patent
Jaekel et al.

(10) Patent No.: US 6,447,062 B1
(45) Date of Patent: Sep. 10, 2002

(54) BACKREST OF A MOTOR VEHICLE SEAT

(75) Inventors: Steffen Jaekel, Hiddenhausen; Peer Küster, Hannover; Mirco Polak, Bad Hersfeld, all of (DE)

(73) Assignee: Bertrand Faure Sitztechnik GmbH & Co. KG, Stadthagen (DE)

( * ) Notice: Subject to any disclaimer, the term of this patent is extended or adjusted under 35 U.S.C. 154(b) by 29 days.

(21) Appl. No.: 09/584,342

(22) Filed: Jun. 1, 2000

(30) Foreign Application Priority Data

Jun. 2, 1999 (DE) .......................................... 199 25 306

(51) Int. Cl.⁷ ................................................ A47C 7/40
(52) U.S. Cl. ..................... 297/284.7; 297/353; 297/410
(58) Field of Search ........................... 297/284.1, 284.4, 297/284.7, 353, 410

(56) References Cited

U.S. PATENT DOCUMENTS

| | | | | |
|---|---|---|---|---|
| 4,732,423 A | * | 3/1988 | Condon | 297/353 |
| 5,228,747 A | * | 7/1993 | Greene | 297/284.7 |
| 5,695,245 A | * | 12/1997 | Carlson et al. | 297/284.7 |
| 5,836,647 A | * | 11/1998 | Turman | 297/353 |
| 5,836,651 A | * | 11/1998 | Szerdahelyi et al. | 297/353 |

FOREIGN PATENT DOCUMENTS

| | | | | |
|---|---|---|---|---|
| DE | 2001412 | * | 11/1970 | ............... 297/284.7 |
| DE | G 85 07 191.9 | | 3/1985 | |
| DE | 44 05 397 C1 | | 2/1994 | |
| DE | G 92 06 122.2 | | 5/2002 | |

\* cited by examiner

Primary Examiner—Peter R. Brown
(74) Attorney, Agent, or Firm—Connolly Bove Lodge & Hutz, LLP

(57) ABSTRACT

An adjustable backrest of a motor vehicle seat is provided. The backrest includes two vertical, laterally undivided stationary supportive areas, and a central supportive area arranged between them. The central supportive area includes an upper section, as a guided headrest, the height of which may be adjusted. The central supportive area, that is provided beneath the headrest, is embodied in such a way as to be divided horizontally into a lower and a central section. The lower section is arranged to be stationary and the central section is arranged such that its height may be adjusted.

6 Claims, 6 Drawing Sheets

BACKREST OF A MOTOR VEHICLE SEAT

FIELD OF THE INVENTION

The invention pertains to a backrest having two vertical, laterally undivided stationary supportive areas and a central supportive area therebetween and including height adjustable guide headrest.

BACKGROUND OF THE INVENTION

In the case of a known backrest of this type as described, for example, in DE 92 06 122 U1, lateral supportive areas, which assure the requisite lateral support for the user, adjoin a central backrest area. Between the lateral supportive areas, at the upper end of the central area, a headrest is provided in such a manner that its height may be adjusted.

Such a backrest allows nothing more than the adjustment of the headrest to the varying size of various users of the seat. The portion of the backrest that continually accepts and supports the user's back, is not variable in the case of such designs, and accordingly, it can be anatomically correct only for those seat users who fall within a certain size range.

SUMMARY OF THE INVENTION

Taking this state of the art as a point of departure, it is a purpose of the present invention to embody a backrest of the known type in such a way that it is adjustable in the central region lying beneath the headrest in such a manner that persons of varying sizes are well supported.

This task is accomplished with the backrest of the present invention characterized in that the central supportive area, which is provided beneath the headrest, is embodied so as to be divided horizontally into a lower and a central section, wherein the lower section is embodied so as to be stationary, and the central section is embodied in such a way that it may be repositioned with respect to height.

As a result of the possibility of separate adjustment of an upper area of the backrest, which encompasses the headrest, and a central zone of support, the supporting effect, and thus, the comfort, of seat users of varying sizes is improved. Such a backrest can be simply adapted to various upper body dimensions. This adaptation permits one to sit free of fatigue, even over longer distances of travel.

In the case of a particularly preferred embodiment form, the gaps of demarcation between adjacent sections of the backrest are bridged by finger-shaped projections that engage with one another, so that the supporting effect, which is transferred upwardly, can be manifested uniformly across the entire height of the upper body.

As height increases, the distance of the head from the surface of the seat increases by approximately twice the amount of the distance of the shoulder area. Therefore, according to the invention, in the case of an additional preferred embodiment, the path of the upper section's progress is, in each case, twice as great as that of the central section.

BRIEF DESCRIPTION OF THE DRAWINGS

In what follows, two preferred embodiments of the invention are described in detail with reference to the accompanying drawings, wherein.

DETAILED DESCRIPTION OF THE PREFERRED EMBODIMENT(S)

Figure 1:
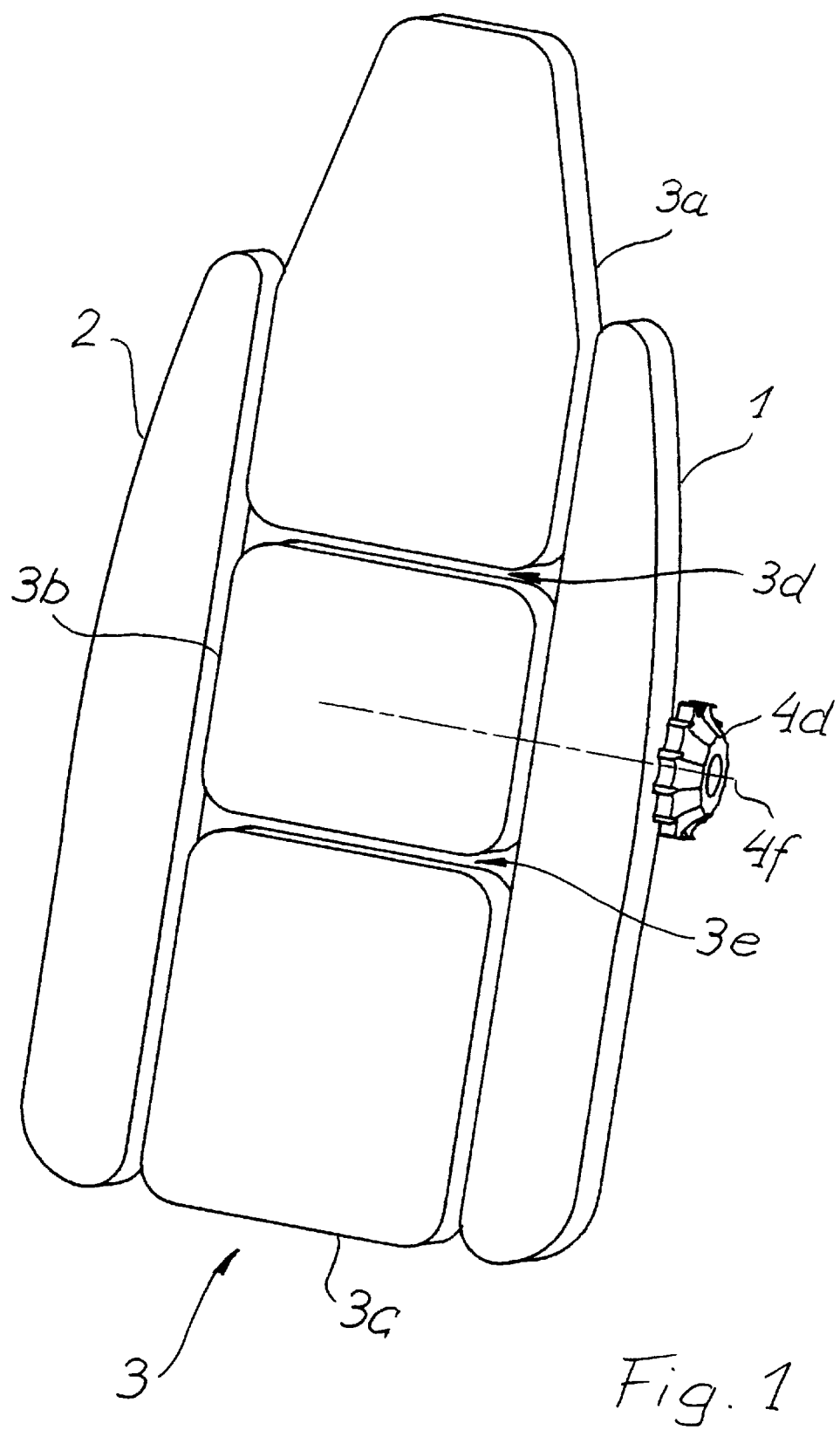
FIG. 1 shows a schematic representation, in perspective, of a backrest in an initial embodiment form, with a multiply divided, central supportive area that is pressed together.

In the drawings, identical parts are provided with identical reference symbols, which are distinguished from each other, when necessary, by means of prime marks.

In the drawings, all that is shown is the backrest of a motor vehicle seat, which encompasses two lateral, solid supportive areas 1 and 2 and a central supportive area 3. The central supportive area 3 is sub-divided into three sections 3a, 3b, and 3c. The lower section 3c is firmly connected to the two lateral supportive areas 1 and 2 and together with them, constitutes a rigid U-shaped frame. A central section 3b and an upper section 3a of the backrest are guided between the lateral supportive areas 1 and 2 in such a way that their position may be shifted. The guide for the sections 3a and 3b, whose position may be shifted, is not shown. The sections 3a and 3b are moved by means of a propulsion unit 4 in order to alter the length of the supportive backrest.

The lower section 3c supports the region of the lordosis of a person using the seat. The central area 3b supports the area of the shoulders. A headrest is integrated into the upper section 3a which protrudes above the lateral supportive areas 1 and 2. The upper section 3a protects the head and the area of the neck of a person in the seat. Between the central section 3b and each of the upper section 3a and the lower section 3c, a joint of demarcation 3d and 3e respectively is provided. In the case of the central supportive rest 3, which is pushed together, as is depicted in FIG. 1, the sections 3a, 3b, and 3c are arranged close to one another. As a result of the shortening of the backrest, the upper body of small persons who use the seat is supported in a manner that is anatomically correct.

Figure 2:
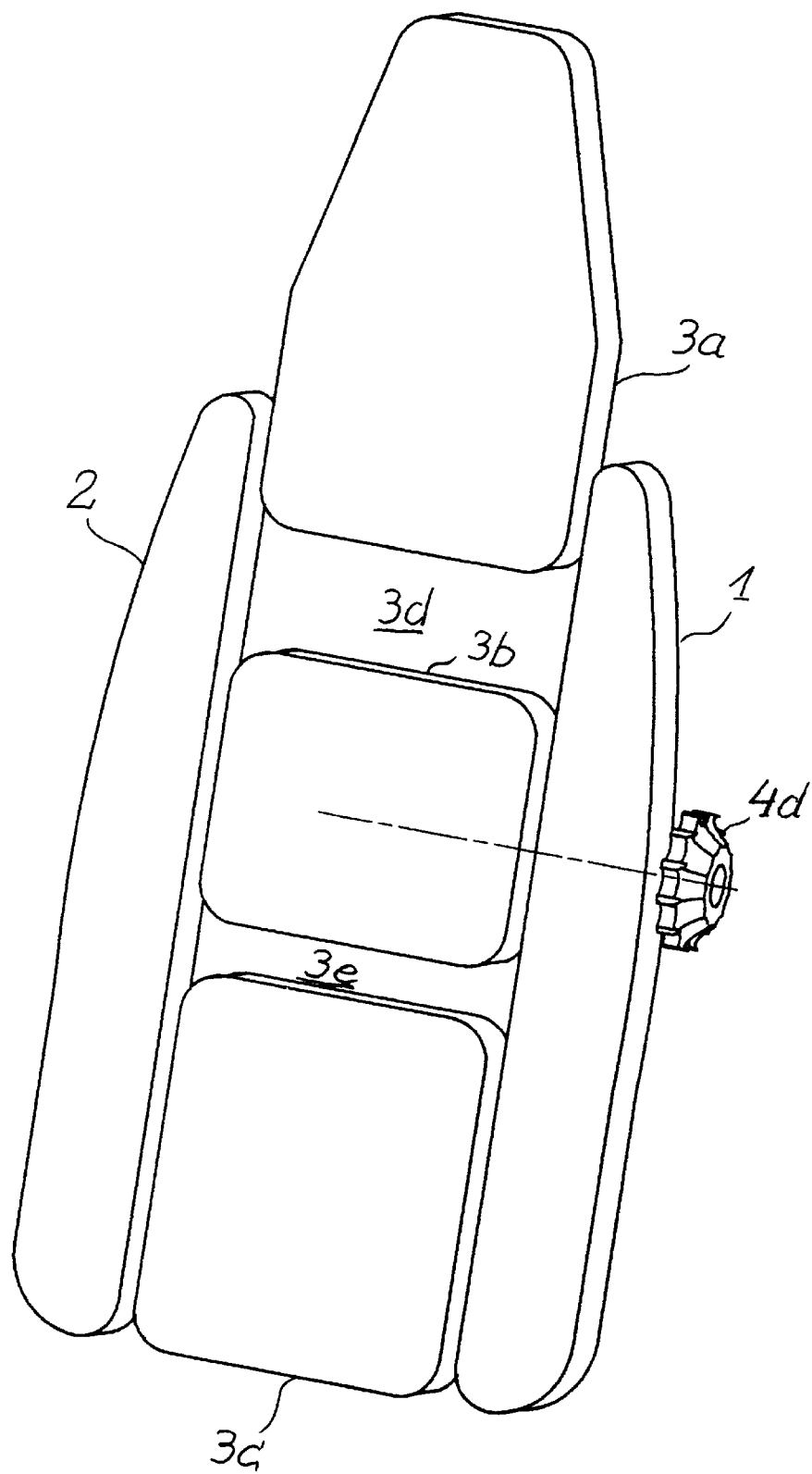
FIG. 2 shows a view, in perspective, of the backrest according to FIG. 1, with an elongated, central supportive area.

The adjustment of the movable sections 3a and 3b relative to the stationary lateral supportive areas 1 and 2 is accomplished using a hand-operated wheel 4d. The wheel 4d is seated on supportive area 1 so as to be capable of rotation around an axis 4f. In the positions of the upper section 3a and of the central section 3b that are depicted in FIG. 2, the backrest has undergone the greatest extension. The joints of demarcation 3d and 3e have expanded to create gaps. The gap between the lower section 3c and the central section 3b is smaller than the gap between the central section 3b and the upper section 3a.

Figure 3:
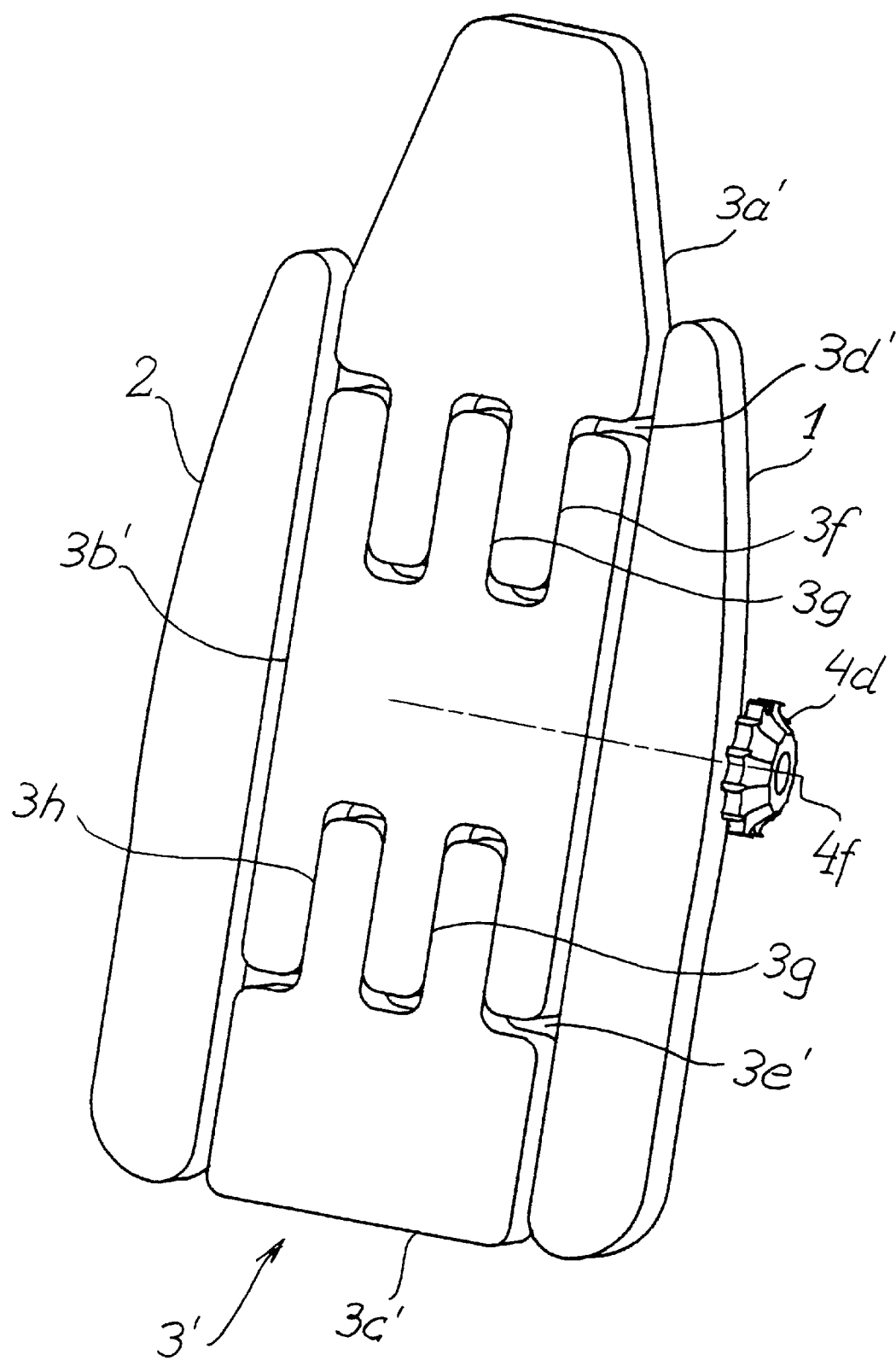
FIG. 3 shows a schematic representation, in perspective, of a second embodiment form of a backrest, with a divided central supportive area.
Figure 4:
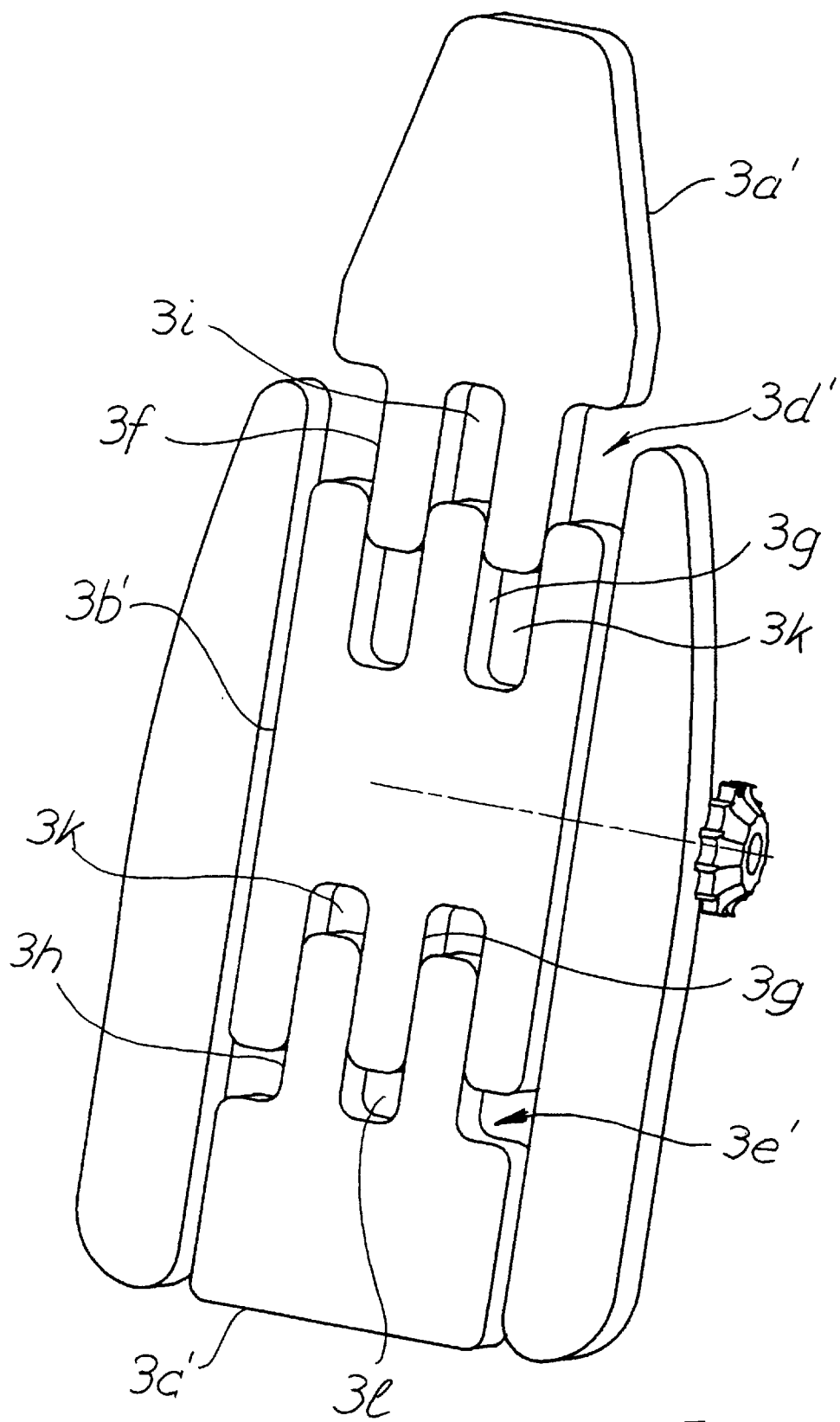
FIG. 4 shows a view, in perspective, of the backrest according to FIG. 3, with an extended, central supportive area.
Figure 5:
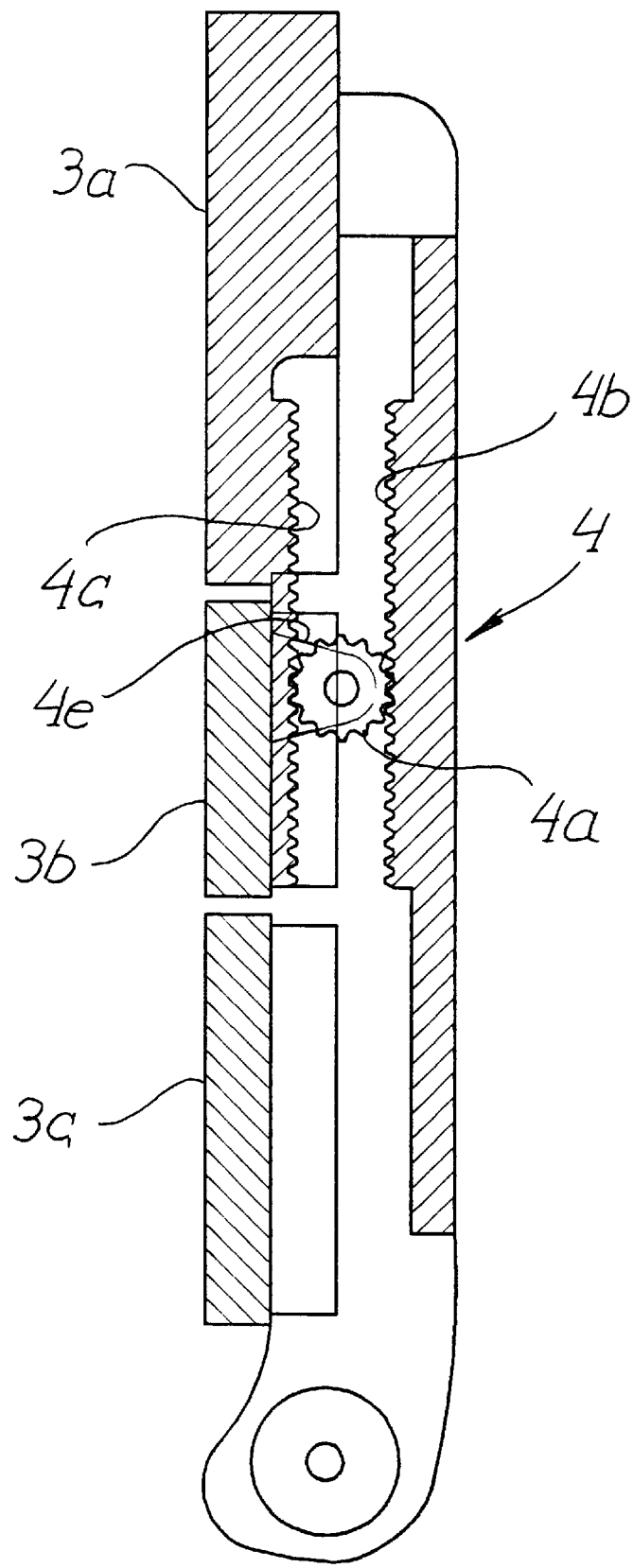
FIG. 5 shows a longitudinal section through the backrest according to FIG. 1.
Figure 6:
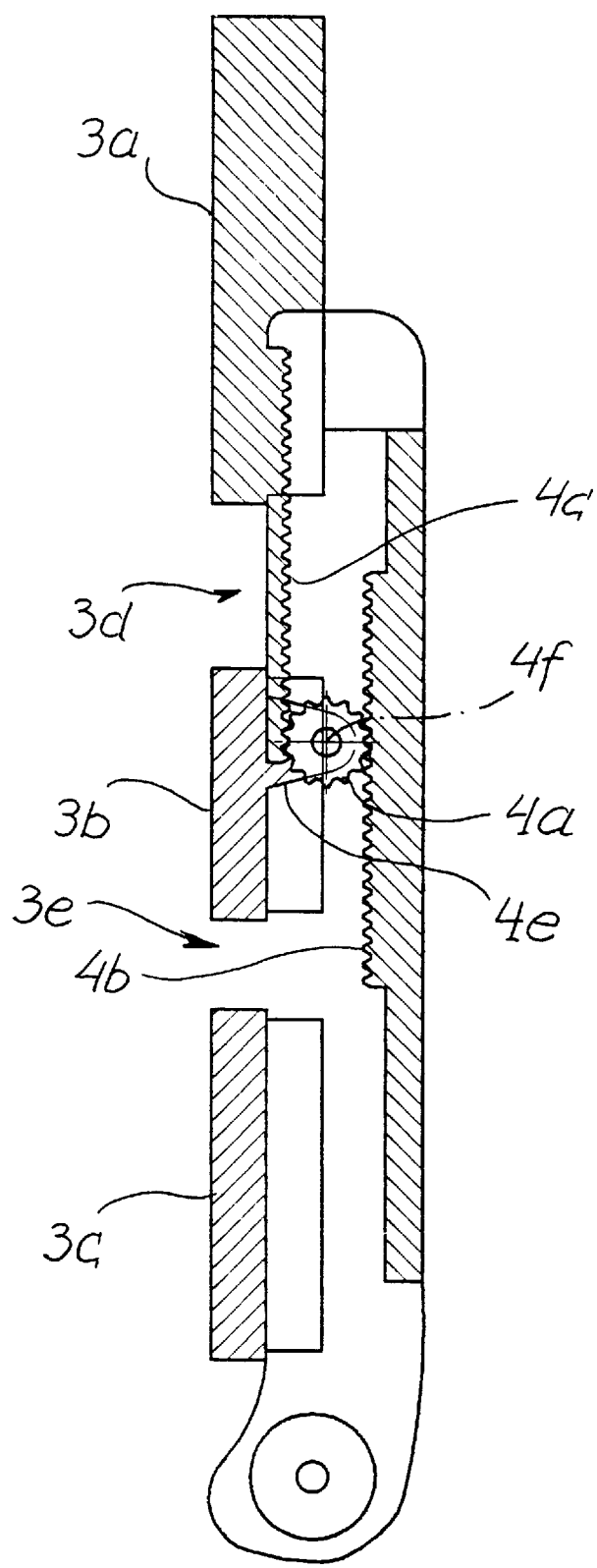
FIG. 6 shows a longitudinal section through the backrest according to FIG. 2.

The second embodiment of the backrest according to the invention, which is depicted in FIGS. 3 and 4, is distinguished from the first embodiment in the configuration of the central area of the central supporting rest 3'. The central section 3b' has finger-like projections 3g that extend upwards and downwards and between which recesses 3k are formed. Finger-shaped projections 3h of the lower section 3c', the recesses of which 3l accept the lower projections 3g of the central section 3b 'engage the lower recesses 3k. Finger-like projections 3f of the upper section 3a' are inserted into the upper recesses 3k of the central section 3b'. The upwardly-pointing projections 3g of the central section 3b' are engaged with recess 3i formed by projections 3f. Even in the case of maximum elongation of the backrest, the projections 3f and 3h overlap with the projections 3g so that a closed contour of the central supportive area 3' is maintained. By this, stability of form is achieved, and areas of varying hardness in the upholstery are no longer discernible to the seat's user.

The repositioning of the central section 3b, and the upper section 3a is accomplished by a drive pinion 4a and two toothed rods 4b, 4c that are propelled in opposite directions. The drive pinion 4a, which may be rotated by the hand-operated wheel 4d, is seated, so as to be capable of rotation, in a bearing block 4e which is solidly connected with the central section 3b. The drive pinion 4a is supported in the toothing of a toothed rod 4b which is connected with the stationary portion of the backrest. On the side that lies opposite the stationary toothed rod 4b, the drive pinion 4a engages with a toothed rod 4c of the upper section 3a. A rotation of the drive pinion 4a, shifts the axle 4f of the propulsion unit 4, because the drive pinion 4a rolls on the stationary toothed rod 4b, and the toothed rod 4c and the upper section 3a which is attached to it.

The propulsion unit 4 can be embodied in identical ways for both embodiments of the backrest. When the upper section 3a is extended, the joint of demarcation 3d is twice as great as the joint of demarcation 3e between the lower section 3c and the central section 3b. This is because for the upper section's path of adjustment, the shifts of axle 4f of drive pinion 4a and of the toothed rod area 4c are added.

We claim:

1. A backrest for a motor vehicle seat comprising:

two lateral supportive areas arranged vertically and a central supportive area positioned between the two lateral supportive areas, wherein the central supportive area comprises a moveable upper section, a moveable central section, and a lower stationary section rigidly connected to the lateral supportive areas, and the upper section is operatively connected to the central section.

2. The backrest of claim 1 wherein the upper section and the central section are capable of moving in concert in the same direction.

3. The backrest of claim 2 wherein the upper section and the central section are capable of moving different distances vertically along the lateral supportive areas.

4. The backrest of claim 3 wherein the distance moved by the upper section is twice the distance moved by the central section.

5. The backrest of claim 1 further comprising, a drive pinion for moving both the upper section and the lower section, the drive pinion being rotatably seated at the central section;

a first toothed rod stationarily connected to the back rest and meshing with the drive pinion; and a second toothed rod connected to the upper section and meshing with the drive pinion.

6. The backrest of claim 1 further comprising first projections extending from the central section towards the upper section and towards the lower section, the projections defining recesses there between; and second and third projections extending from the upper and lower sections, respectively, and being received in the recesses.

* * * * *